United States Patent
Hanazawa et al.

(10) Patent No.: US 11,132,998 B2
(45) Date of Patent: Sep. 28, 2021

(54) VOICE RECOGNITION DEVICE AND VOICE RECOGNITION METHOD

(71) Applicant: MITSUBISHI ELECTRIC CORPORATION, Tokyo (JP)

(72) Inventors: Toshiyuki Hanazawa, Tokyo (JP); Tomohiro Narita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 16/485,010

(22) PCT Filed: Mar. 24, 2017

(86) PCT No.: PCT/JP2017/012085
§ 371 (c)(1),
(2) Date: Aug. 9, 2019

(87) PCT Pub. No.: WO2018/173270
PCT Pub. Date: Sep. 27, 2018

(65) Prior Publication Data
US 2020/0005775 A1  Jan. 2, 2020

(51) Int. Cl.
*G10L 15/20* (2006.01)
*G10L 15/22* (2006.01)
(Continued)

(52) U.S. Cl.
CPC .............. *G10L 15/20* (2013.01); *G10L 15/02* (2013.01); *G10L 15/16* (2013.01); *G10L 15/187* (2013.01);
(Continued)

(58) Field of Classification Search
CPC ......... G10L 15/20; G10L 15/02; G10L 15/16; G10L 15/22; G10L 15/187; G10L 25/84; G10L 2015/025
See application file for complete search history.

(56) References Cited

U.S. PATENT DOCUMENTS 8,239,196 B1 * 8/2012 Paniconi ............. G10L 21/0216
704/233
2003/0125943 A1 * 7/2003 Koshiba ................. G10L 15/20
704/238
(Continued)

FOREIGN PATENT DOCUMENTS

JP    2007-17736 A    1/2007

OTHER PUBLICATIONS

International Search Report, issued in PCT/JP2017/012085, PCT/ISA/210, dated Jun. 13, 2017.
(Continued)

*Primary Examiner* — Paras D Shah
*Assistant Examiner* — Darioush Agahi
(74) *Attorney, Agent, or Firm* — Birch, Stewart, Kolasch & Birch, LLP

(57) ABSTRACT

A voice recognition device includes: a first feature vector calculating unit (2) for calculating a first feature vector from voice data input; an acoustic likelihood calculating unit (4) for calculating an acoustic likelihood of the first feature vector by using an acoustic model used for calculating an acoustic likelihood of a feature vector; a second feature vector calculating unit (3) for calculating a second feature vector from the voice data; a noise degree calculating unit (6) for calculating a noise degree of the second feature vector by using a discriminant model used for calculating a noise degree indicating whether a feature vector is noise or voice; a noise likelihood recalculating unit (8) for recalculating an acoustic likelihood of noise on the basis of the acoustic likelihood of the first feature vector and the noise degree of the second feature vector; and a collation unit (9) for performing collation with a pattern of a vocabulary word to be recognized, by using the acoustic likelihood calculated (Continued)

and the acoustic likelihood of noise recalculated, and outputting a recognition result of the voice data.

4 Claims, 6 Drawing Sheets

(51) Int. Cl.
　　　*G10L 15/02* 　　　(2006.01)
　　　*G10L 15/16* 　　　(2006.01)
　　　*G10L 15/187* 　　(2013.01)
　　　*G10L 25/84* 　　　(2013.01)
(52) U.S. Cl.
　　　CPC .............. *G10L 15/22* (2013.01); *G10L 25/84* (2013.01); *G10L 2015/025* (2013.01)

(56) References Cited

U.S. PATENT DOCUMENTS

| 2008/0221896 | A1* | 9/2008 | Cai | G10L 15/19 704/270.1 |
| 2016/0034811 | A1* | 2/2016 | Paulik et al. | G06N 3/0454 706/20 |

OTHER PUBLICATIONS

Sato et al. "News Bangumi ni Okeru Zatsuon Model o Riyo shita Onkyo Score no Hoseiho", Report of the 2003 Autumn Meeting of the Acoustical Society of Japan-I-, Sep. 17, 2003, pp. 31 to 32, ISSN:1340-3168.

* cited by examiner

VOICE RECOGNITION DEVICE AND VOICE RECOGNITION METHOD

TECHNICAL FIELD

The present invention relates to a technology for improving recognition performance of voice recognition under noise.

BACKGROUND ART

Voice recognition is performed by cutting out an uttered voice section from an input signal and performing collation with a standard pattern prepared in advance. When the beginning of an utterance is an unvoiced consonant or when the utterance is weak, it is difficult to cut out the voice section accurately, so that the cutting out of the voice section is usually performed with addition of some margin (for example, 200 msec) section before and after the utterance. There is a possibility that the margin section includes only a section that does not include voice, that is, there is a possibility that the margin section includes only ambient environmental noise (hereinafter referred to as noise). For this reason, it is general to create, as the standard pattern used for voice recognition, in addition to a standard pattern of voice, a standard pattern of noise in advance, and at the time of voice recognition, to perform pattern matching including the margin sections.

However, since types of noise are diverse, it is difficult to create standard patterns for all noises in advance. There is a problem that when a noise section at the time of recognition is greatly different from the standard pattern of noise, the standard pattern of voice has a higher likelihood that is a degree of similarity to the noise section than that of the standard pattern of noise, and thereby causing the noise to be erroneously recognized as voice.

As a technology for solving this problem, Patent Literature 1 discloses a voice recognition device for correcting a likelihood of a garbage model that is a standard pattern of noise on the basis of a feature value of input data. In the voice recognition device of Patent Literature 1, it is determined whether a section for which the likelihood is to be calculated seems like noise or seems like voice with use of various feature values of input data, and a positive value is added to the likelihood of the garbage model when the section for which the likelihood is to be calculated seems like noise. As a result, a phenomenon is reduced in which the standard pattern of voice has a higher likelihood than that of the standard pattern of noise in the noise section and erroneous recognition as voice is caused.

CITATION LIST

Patent Literature

Patent Literature 1: JP 2007-17736 A

SUMMARY OF INVENTION

Technical Problem

Since the voice recognition device described in Patent Literature 1 corrects the likelihood of the garbage model, there has been a problem that when the feature values are greatly different from each other between the noise data used at the time of garbage model creation and the noise data at the time of voice recognition, for example, when the likelihood of the garbage model before correction is greatly reduced, even though the likelihood is corrected, the phenomenon is not eliminated in which the likelihood of the standard pattern of voice is higher.

The present invention has been made to solve the problem as described above, and it is an object to suppress degradation of voice recognition performance even when the feature values are greatly different from each other between the noise data used in creation of the standard pattern of noise and the noise data at the time of voice recognition.

Solution to Problem

A voice recognition device according to the present invention includes: a processor to execute a program; and a memory to store the program which, when executed by the processor, performs processes of, calculating a first feature vector from voice data input; calculating acoustic likelihoods of respective phonemes and an acoustic likelihood of noise of the first feature vector, by using an acoustic model used for calculating an acoustic likelihood of a feature vector; calculating a second feature vector from the voice data; calculating a noise degree of the second feature vector, by using a discriminant model used for calculating a noise degree indicating whether a feature vector is noise or voice; recalculating an acoustic likelihood of noise on the basis of a larger value between the acoustic likelihood of noise of the first feature vector, and a likelihood that is calculated by adding a maximum value of the acoustic likelihoods of respective phonemes to the noise degree of the second feature vector; and performing collation with a pattern of a vocabulary word to be recognized, by using the acoustic likelihoods of respective phonemes calculated and the acoustic likelihood of noise recalculated, and outputting a recognition result of the voice data.

Advantageous Effects of Invention

According to the present invention, the degradation of the voice recognition performance can be suppressed even when the feature values are greatly different from each other between the noise data used in creation of the standard pattern of noise and the noise data at the time of voice recognition.

DESCRIPTION OF EMBODIMENTS

Hereinafter, to explain the present invention in more detail, embodiments for carrying out the present invention will be described with reference to the accompanying drawings.

First Embodiment

Figure 1:
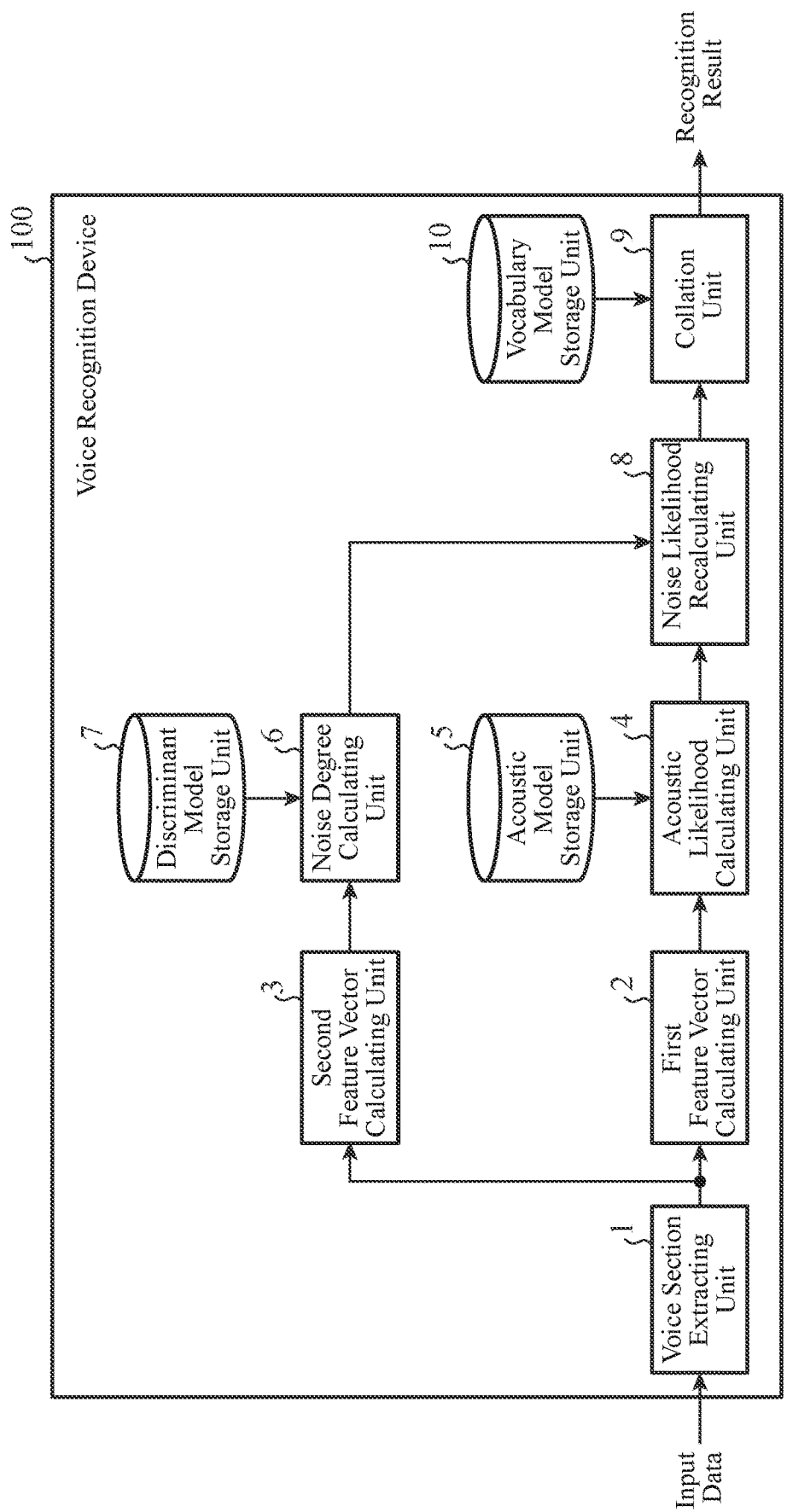
FIG. 1 is a block diagram illustrating a configuration of a voice recognition device according to a first embodiment.

FIG. 1 is a block diagram illustrating a configuration of a voice recognition device 100 according to a first embodiment.

The voice recognition device 100 includes a voice section extracting unit 1, a first feature vector calculating unit 2, a second feature vector calculating unit 3, an acoustic likelihood calculating unit 4, an acoustic model storage unit 5, a noise degree calculating unit 6, a discriminant model storage unit 7, a noise likelihood recalculating unit 8, a collation unit 9, and a vocabulary model storage unit 10.

The voice section extracting unit 1 extracts a section including voice from input data. The voice section extracting unit 1 outputs voice data of the extracted section including the voice to the first feature vector calculating unit 2 and the second feature vector calculating unit 3. The voice section extracting unit 1 calculates, for example, power of the input data, and extracts a section in which a preset margin (for example, 200 msec) is added before and after a section whose power is greater than or equal to a preset threshold value. When the beginning of an utterance is an unvoiced consonant or when the utterance is weak, the power of the section may be less than the preset threshold value, and thus the voice section may be missed. The voice section extracting unit 1 extracts the section in which the preset margin is added before and after the section whose power is greater than or equal to the preset threshold value, whereby the above-described miss of the voice section can be suppressed. Note that, the section added as the margin may include both voice and noise.

The first feature vector calculating unit 2 divides the voice data extracted by the voice section extracting unit 1 into short time sections called frames. The first feature vector calculating unit 2 performs acoustic analysis for voice recognition on each divided frame, and calculates a feature vector (hereinafter, referred to as a first feature vector) for voice recognition. The first feature vector is a 12-dimensional vector of the first to twelfth orders of mel-frequency cepstrum coefficients (MFCCs). The first feature vector calculating unit 2 outputs the first feature vector calculated to the acoustic likelihood calculating unit 4.

The second feature vector calculating unit 3 divides the voice data extracted by the voice section extracting unit 1 into frames similarly to the first feature vector calculating unit 2. The second feature vector calculating unit 3 performs acoustic analysis for discriminating between voice and noise on each frame, and calculates a feature vector (hereinafter referred to as a second feature vector) for discriminating between voice and noise. The second feature vector calculating unit 3 outputs the second feature vector calculated to the noise degree calculating unit 6.

Here, the second feature vector is a 13-dimensional vector in which a high-order peak value of an autocorrelation coefficient is added to 12-dimensional data of the MFCCs that is the first feature vector. The higher order of the autocorrelation coefficient is an order corresponding to 80 Hz to 350 Hz that are the fundamental frequencies of voice. The high-order peak value of the autocorrelation coefficient is a feature value effective for discriminating between a vowel and noise, so that the high-order peak value is used as one element of the second feature vector of voice and noise.

The acoustic likelihood calculating unit 4 collates, for each frame, the first feature vector calculated by the first feature vector calculating unit 2 with an acoustic model stored in the acoustic model storage unit 5, and calculates a time series of acoustic likelihoods of phonemes and noise. The acoustic likelihood calculating unit 4 outputs the calculated time series of the acoustic likelihoods of phonemes and noise to the noise likelihood recalculating unit 8.

Here, phonemes are vowels and consonants. In addition, the likelihood is an index equivalent to similarity, and, for example, a frame having a high likelihood of a vowel "a" means that the frame is data of the vowel "a" with a high probability.

Figure 2:
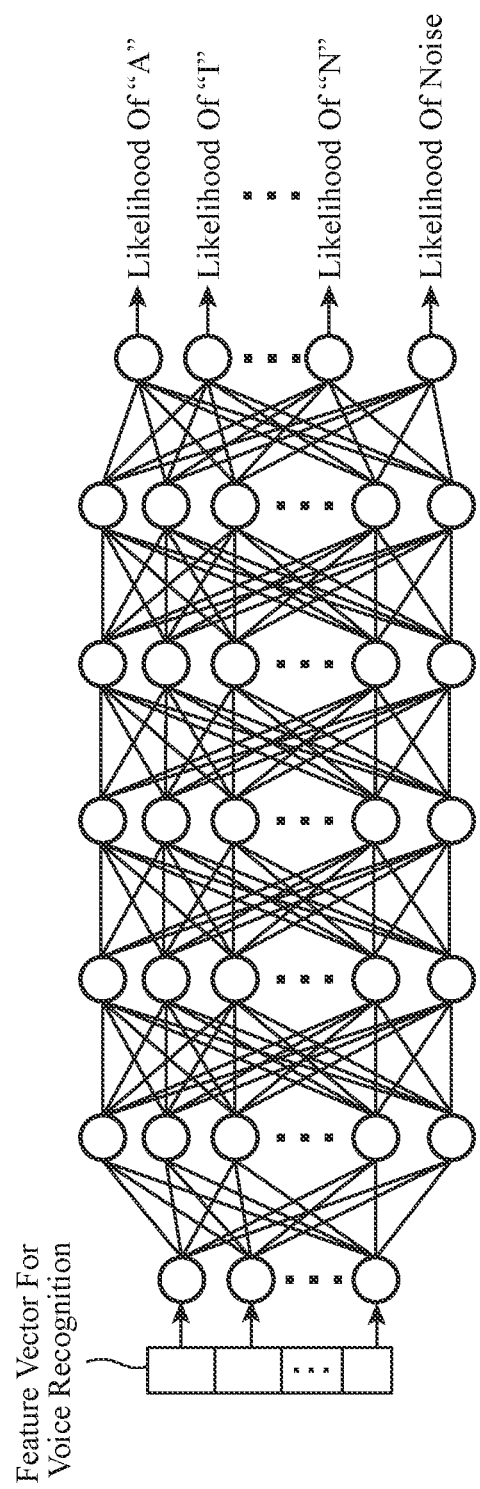
FIG. 2 is a diagram illustrating an example of an acoustic model in the voice recognition device according to the first embodiment.

The acoustic model storage unit 5 stores the acoustic model. The acoustic model is configured by, for example, a deep neural network (DNN). In FIG. 2, an example is illustrated of the DNN that is the acoustic model.

FIG. 2 is a diagram illustrating an example of the acoustic model in the voice recognition device 100 according to the first embodiment.

As illustrated in FIG. 2, output units of the DNN are associated with phonemes ("A", "I", . . . , "N", and the like in FIG. 2) and a noise section. Then, learning is performed in advance so that the likelihoods of phonemes and noise are output. In the learning, feature vectors for voice recognition are used, the feature vectors being obtained by analyzing voice data of many speakers. In addition, as voice data used for learning, data is used in which a section of background noise exists before and after an utterance, whereby an output unit for noise is also learned.

The noise degree calculating unit 6 collates the second feature vector for each frame that is the output of the second feature vector calculating unit 3 with a voice Gaussian mixture model (GMM) and a noise GMM that are discriminant models stored in the discriminant model storage unit 7. The noise degree calculating unit 6 obtains a likelihood Gs of the voice GMM and a likelihood Gn of the noise GMM, and calculates a noise degree Pn on the basis of an equation (1) below.

$$Pn = Gn - Gs \quad (1)$$

As indicated in the equation (1), since the noise degree Pn is a likelihood difference between the noise GMM and the voice GMM, the noise degree Pn takes a positive value when data of a frame to be used for collation described later seems like noise, and takes a negative value when the data seems like voice.

The discriminant model storage unit 7 stores a discriminant model for determining whether the data for each frame input to the noise degree calculating unit 6 is voice or noise. In the first embodiment, a case will be described where a Gaussian mixture model (GMM) is used as a discriminant model. The discriminant model storage unit 7 stores the GMM configured by the voice GMM and the noise GMM. For the voice GMM, learning has been performed with use of a feature vector for discriminating between voice and noise in diverse utterance data of many speakers. In addition, for the noise GMM, learning has been performed with use of a feature vector for discriminating between voice and noise in diverse noise data under an environment where the voice recognition device 100 is assumed to be used.

The discriminant model is a model for the purpose of discriminating between voice and noise of data for each frame, and is not a model for the purpose of determining which phoneme a voice is. The voice GMM is obtained by learning using less data than the voice data used for learning of the acoustic model stored in the acoustic model storage unit 5. On the other hand, the noise GMM can discriminates between voice and noise with high accuracy for diverse noises, by learning using noises more diverse than the learning data for the acoustic model stored in the acoustic model storage unit 5.

With the acoustic likelihoods of phonemes and noise that are the output of the acoustic likelihood calculating unit 4 and the noise degree Pn that is the output of the noise degree calculating unit 6, as input, the noise likelihood recalculating unit 8 calculates a recalculation noise likelihood Ln on the basis of an equation (2) below.

$$Ln=\text{MAX}(Ln0,Ln1) \quad (2)$$

In the equation (2) described above, Ln0 is the acoustic likelihood of noise input from the acoustic likelihood calculating unit 4, and Ln1 is a likelihood calculated by using an equation (3) below on the basis of the noise degree Pn.

$$Ln1=L\text{max}+\alpha^*Pn \quad (3)$$

In the equation (3) described above, Lmax is a maximum value of the acoustic likelihoods of respective phonemes output from the acoustic likelihood calculating unit 4, and $\alpha$ is a positive constant experimentally determined.

As indicated in the equation (3), when the noise degree Pn is a positive value, Ln1 is a value greater than or equal to Lmax. Thus, the recalculation noise likelihood Ln calculated by the equation (2) is also a value greater than or equal to Lmax. As described above, since Lmax is the maximum value of the acoustic likelihoods of respective phonemes, it is guaranteed that the recalculation noise likelihood Ln is a value greater than or equal to the acoustic likelihoods of respective phonemes. Thus, it can be prevented that the acoustic likelihood of phoneme is higher than the acoustic likelihood of noise in the noise section. As a result, it can be suppressed that a section that seems like noise is erroneously recognized as a section that seems like voice in the voice recognition device 100. In addition, as indicated in the equation (3), when the noise degree Pn is a negative value, Ln1 is a value smaller than Lmax, and thus it can be prevented that the recalculation noise likelihood Ln is an inappropriately high value in a section that does not seem like noise.

The noise likelihood recalculating unit 8 outputs, to the collation unit 9, the recalculation noise likelihood Ln calculated, and the acoustic likelihoods of respective phonemes calculated by the acoustic likelihood calculating unit 4.

With the recalculation noise likelihood Ln and the acoustic likelihoods of respective phonemes output from the noise likelihood recalculating unit 8, as input, the collation unit 9 performs collation by using both a standard pattern of each vocabulary word in a vocabulary model of a vocabulary to be recognized stored in the vocabulary model storage unit 10 and the Viterbi algorithm, and calculates a likelihood of each vocabulary word. The collation unit 9 outputs a vocabulary word having the highest likelihood calculated, as a recognition result.

The vocabulary model storage unit 10 stores a standard pattern of a vocabulary word to be recognized. The standard pattern of the vocabulary word is created by connecting, for example, hidden Markov models (HMMs) in phoneme units together.

The standard pattern stored in the vocabulary model storage unit 10 will be described by taking, as an example, a case where a recognition target is a Japanese prefectural name. For example, in the case of a vocabulary word "Tokyo (tookyoo)", since the phoneme series is "t, o, o, k, j, o, o", the HMMs of the phonemes are connected together to create a standard pattern. However, since a margin section is added before and after the voice section for the input data to be collated, the standard pattern is configured with addition of an HMM of noise before and after the phoneme series of the recognition vocabulary word. Thus, in the case of the vocabulary word "Tokyo (tookyoo)", the standard pattern is "#, t, o, o, k, j, o, o, #". Here, # represents the HMM of noise.

Note that, in ordinary voice recognition using the HMM, the acoustic likelihood is calculated by using the HMM. On the other hand, in the voice recognition device 100, since the acoustic likelihoods of phonemes and noise are calculated in the acoustic likelihood calculating unit 4 and the noise likelihood recalculating unit 8, the acoustic likelihoods of phonemes and noise are used instead of processing of calculating the acoustic likelihood by using the HMM. For example, as an acoustic likelihood of an MINI of a phoneme "a", an acoustic likelihood of the phoneme "a" calculated by the acoustic likelihood calculating unit 4 is used.

Next, a hardware configuration example will be described of the voice recognition device 100.

Figure 3A:
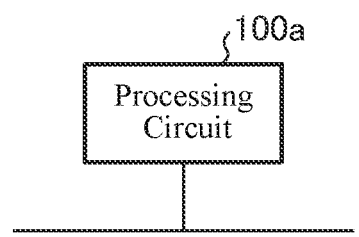
FIGS. 3A and 3B are diagrams each illustrating a hardware configuration example of the voice recognition device according to the first embodiment.
Figure 3B:
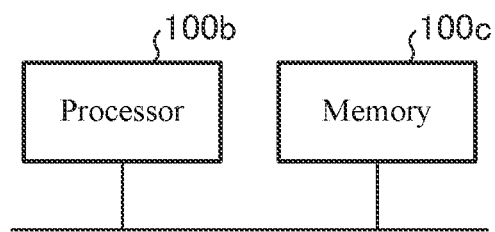

FIGS. 3A and 3B are diagrams each illustrating a hardware configuration example of the voice recognition device 100.

In the voice recognition device 100, a processing circuit implements functions of the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9. That is, the voice recognition device 100 includes the processing circuit for implementing the functions described above. The processing circuit may be a processing circuit 100a that is dedicated hardware as illustrated in FIG. 3A, or a processor 100b for executing a program stored in a memory 100c as illustrated in FIG. 3B.

As illustrated in FIG. 3A, when dedicated hardware is used for the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9, examples of the processing circuit 100a include a single circuit, a composite circuit, a programmed processor, a parallel-programmed processor, an application specific integrated circuit (ASIC), a field-programmable gate array (FPGA), and a combination thereof. For the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9, each of the functions of the units may be implemented by a processing circuit, or the functions of the units may be implemented together by one processing circuit.

As illustrated in FIG. 3B, when the processor 100b is used for the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9, the functions of the units are implemented by software, firmware, or a combination of software and firmware. The software or the firmware is described as a program and stored in the memory 100c. The processor 100b reads and executes programs stored in the memory 100c, thereby implementing the functions of the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9. That is, in the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9, the memory 100c is included for storing a program by which each step illustrated in FIG. 4 described later is resultantly executed when executed by the processor 100b. In addition, it can also be said that these programs cause a computer to execute procedures or methods of the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9.

Here, the processor 100b is, for example, a central processing unit (CPU), a processing device, an arithmetic device, a processor, a microprocessor, a microcomputer, a digital signal processor (DSP), or the like.

For example, the memory 100c may be a nonvolatile or volatile semiconductor memory such as a random access memory (RAM), a read only memory (ROM), a flash memory, an erasable programmable ROM (EPROM), or an electrically EPROM (EEPROM), may be a magnetic disk such as a hard disk or a flexible disk, or may be an optical disk such as a mini disk, a compact disk (CD), or a digital versatile disc (DVD).

Note that, for functions of the voice section extracting unit 1, the first feature vector calculating unit 2, the second feature vector calculating unit 3, the acoustic likelihood calculating unit 4, the noise degree calculating unit 6, the noise likelihood recalculating unit 8, and the collation unit 9, some of the functions may be implemented by dedicated hardware and some of the functions may be implemented by software or firmware. As described above, the processing circuit 100a in the voice recognition device 100 can implement the above-described functions by hardware, software, firmware, or a combination thereof.

Next, operation will be described of the voice recognition device 100.

Figure 4:
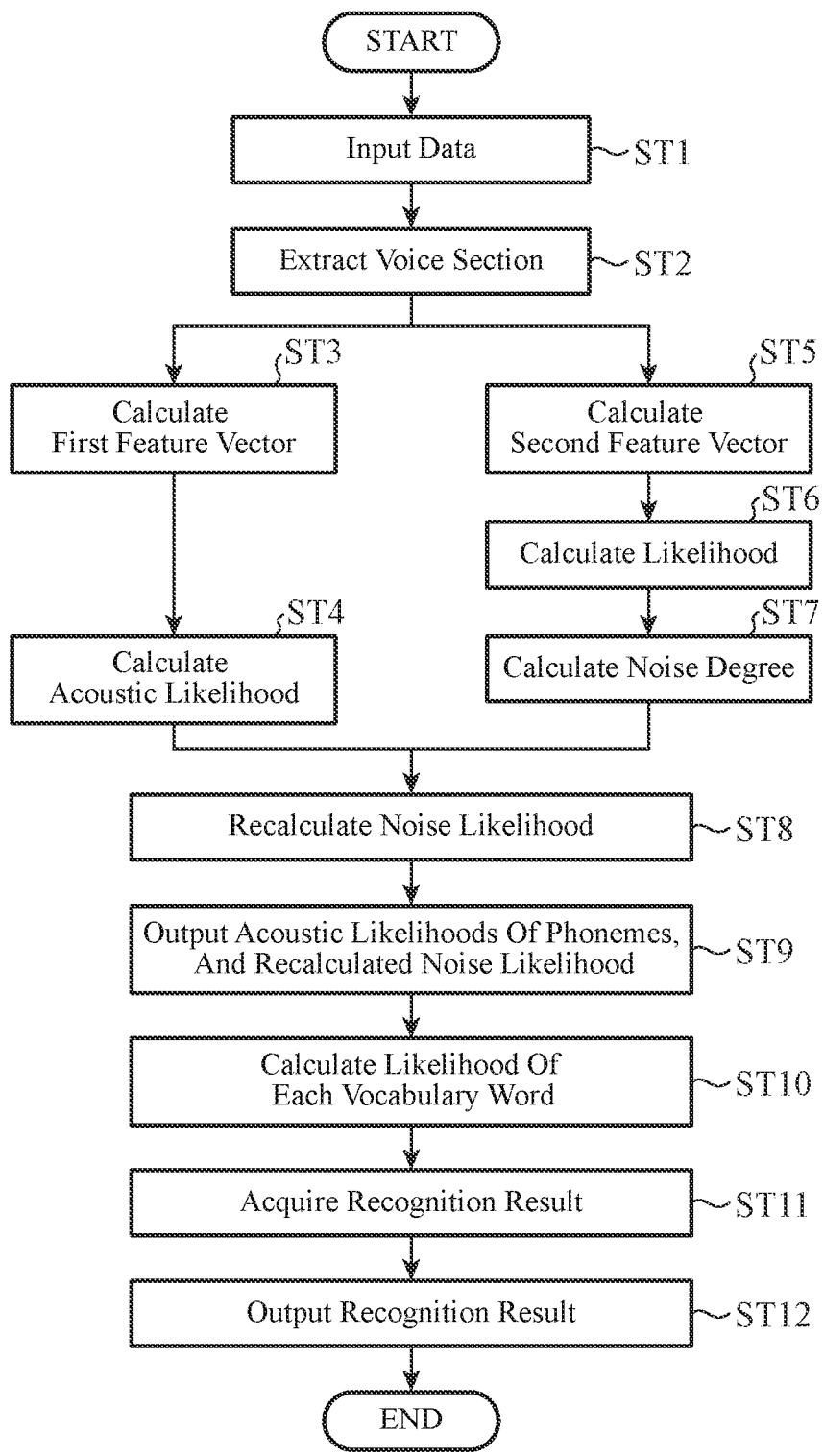
FIG. 4 is a flowchart illustrating operation of the voice recognition device according to the first embodiment.

FIG. 4 is a flowchart illustrating the operation of the voice recognition device 100 according to the first embodiment.

When data is input to the voice recognition device 100 (step ST1), the voice section extracting unit 1 extracts, as a voice section, a section in which the preset margin is added before and after a section whose power is greater than or equal to the threshold value, from the input data (step ST2). The voice section extracting unit 1 outputs the voice data of the extracted voice section to the first feature vector calculating unit 2 and the second feature vector calculating unit 3. The first feature vector calculating unit 2 divides the voice data of the voice section extracted in step ST2 into frames, performs acoustic analysis for voice recognition on each frame, and calculates the first feature vector (step ST3). The first feature vector calculating unit 2 outputs the first feature vector calculated to the acoustic likelihood calculating unit 4.

The acoustic likelihood calculating unit 4 collates the first feature vector for each frame calculated in step ST3 with the acoustic model stored in the acoustic model storage unit 5, and calculates the acoustic likelihoods of phonemes and noise (step ST4). The acoustic likelihood calculating unit 4 outputs the acoustic likelihoods calculated to the noise likelihood recalculating unit 8. The second feature vector calculating unit 3 operates in parallel with the first feature vector calculating unit 2, divides the voice data of the voice section extracted in step ST2 into frames, performs acoustic analysis for discriminating between voice and noise on each frame, and calculates the second feature vector (step ST5). The second feature vector calculating unit 3 outputs the second feature vector calculated to the noise degree calculating unit 6.

The noise degree calculating unit 6 collates the second feature vector calculated in step ST5 with the voice GMM and the noise GMM that are discriminant models stored in the discriminant model storage unit 7, and calculates the likelihood Gs of the voice GMM and the likelihood Gn of the noise GMM (step ST6). The noise degree calculating unit 6 calculates the noise degree Pn on the basis of the equation (1) described above by using the likelihood Gs of the voice GMM and the likelihood Gn of the noise GMM calculated in step ST6 (step ST7). The noise degree calculating unit 6 outputs the noise degree Pn calculated to the noise likelihood recalculating unit 8.

The noise likelihood recalculating unit 8 calculates the recalculation noise likelihood Ln recalculated on the basis of the equation (2) described above by using the acoustic likelihoods of phonemes and noise calculated in step ST4 and the noise degree Pn calculated in step ST7 (step ST8). The noise likelihood recalculating unit 8 outputs, to the collation unit 9, the recalculation noise likelihood Ln calculated and the acoustic likelihoods of respective phonemes (step ST9).

With the recalculation noise likelihood Ln and the acoustic likelihoods of respective phonemes output from the noise likelihood recalculating unit 8 in step ST9, as input, the collation unit 9 performs collation by using both the standard pattern of each vocabulary word in the vocabulary model stored in the vocabulary model storage unit 10 and the Viterbi algorithm, and calculates the likelihood of each vocabulary word (step ST10). The collation unit 9 sets the vocabulary word having the highest likelihood as the recognition result, among the likelihoods of the vocabulary words calculated in step ST10 (step ST11). The collation unit 9 outputs the recognition result acquired in step ST11 to the outside (step ST12), and the processing ends.

As described above, according to the first embodiment, it is configured to include: the first feature vector calculating unit 2 for calculating the first feature vector from the voice data input; the acoustic likelihood calculating unit 4 for calculating the acoustic likelihood of the first feature vector by using the acoustic model used for calculating the acoustic likelihood of the feature vector; the second feature vector calculating unit 3 for calculating the second feature vector from the voice data; the noise degree calculating unit 6 for calculating the noise degree of the second feature vector by using the discriminant model used for calculating the noise degree indicating whether the feature vector is noise or voice; the noise likelihood recalculating unit 8 for recalculating the acoustic likelihood of noise on the basis of the calculated acoustic likelihood of the first feature vector and the calculated noise degree of the second feature vector; and the collation unit 9 for performing collation with the pattern of the vocabulary word to be recognized, by using the calculated acoustic likelihood and the recalculated acoustic likelihood of noise, and outputting the recognition result of the voice data, so that it can be suppressed that the likelihood of phoneme exceeds the likelihood of noise in the noise section, and an appropriate likelihood can be given to the standard pattern of noise in the noise section. As a result, recognition performance of the voice recognition device can be improved.

Second Embodiment

In this second embodiment, a configuration will be described in which a neural network is used as a discriminant model.

The configuration of a voice recognition device 100 of the second embodiment is the same as the configuration of the voice recognition device 100 of the first embodiment illustrated in FIG. 1, so that illustration of the block diagram is omitted. In addition, components of the voice recognition device 100 of the second embodiment will be described with the same reference numerals as those used in the first embodiment.

It is assumed that configurations are the same as each other between the first feature vector calculating unit 2 and the second feature vector calculating unit 3. Thus, the first feature vector calculated by the first feature vector calculating unit 2 and the second feature vector calculated by the second feature vector calculating unit 3 are the same feature vectors.

An acoustic model stored in the acoustic model storage unit 5 is a neural network having one or more intermediate layers.

The discriminant model stored in the discriminant model storage unit 7 is a neural network in which zero or more intermediate layers and one output layer are added to the intermediate layers or output layer of the neural network of the acoustic model stored in the acoustic model storage unit 5.

Figure 5:
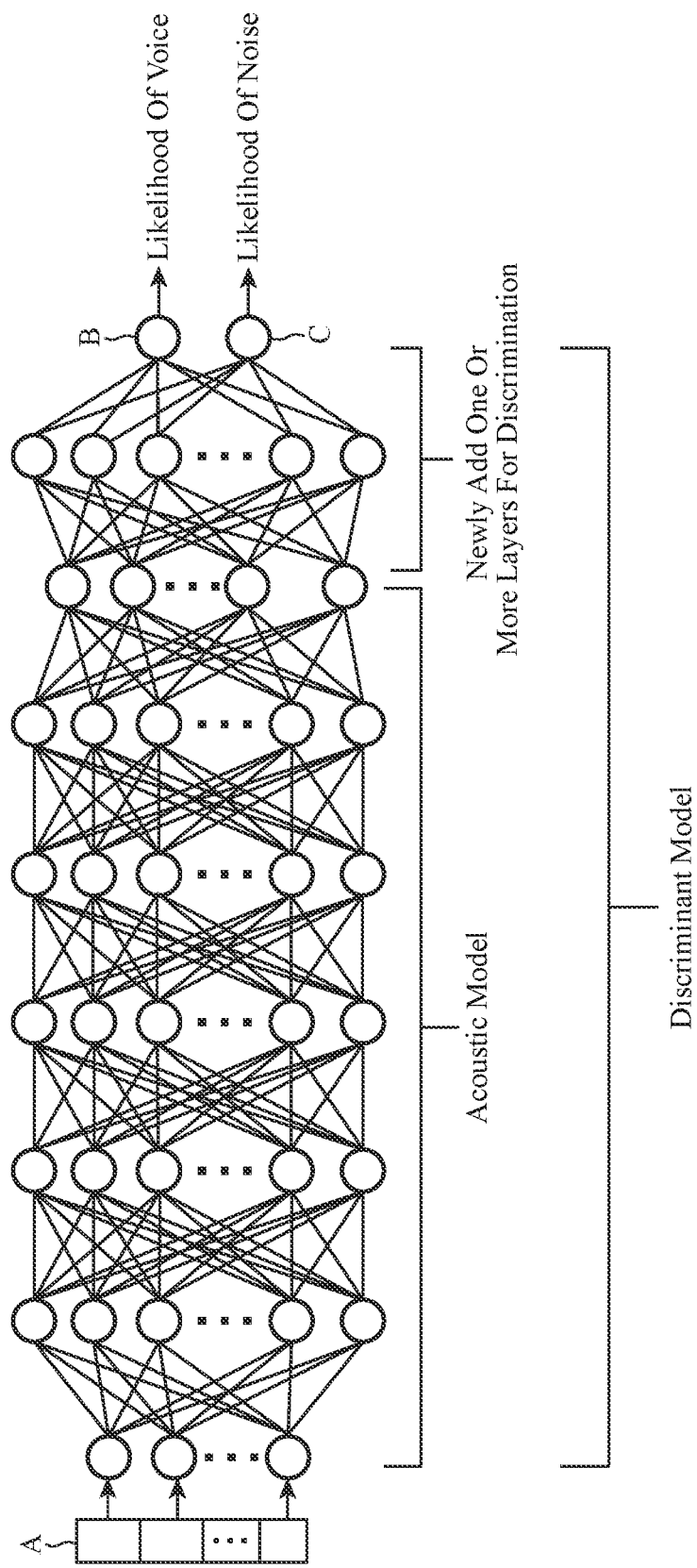
FIG. 5 is a configuration diagram illustrating an example of a discriminant model in a voice recognition device according to a second embodiment.

FIG. 5 is a diagram illustrating an example of the discriminant model in the voice recognition device 100 according to the second embodiment.

The discriminant model illustrated in FIG. 5 is configured with addition of one intermediate layer and one output layer to the neural network of the acoustic model. The input to the neural network of the discriminant model is a second feature vector A for voice recognition. There are two output units of the neural network of the discriminant model, one output unit B corresponds to a likelihood of voice, and the other output unit C corresponds to a likelihood of noise. By replacing the output of the output unit B with the likelihood Gs of the voice GMM described in the first embodiment and replacing the output of the output unit C with the likelihood Gn of the noise GMM, and applying them to the equation (1), the noise degree is calculated on the basis of the equation (1) similarly to the first embodiment.

In the discriminant model, learning is separately performed only for parameters of the added layers, and other parameters are the same as those of the acoustic model stored in the acoustic model storage unit 5. In the discriminant model, the learning is necessary only for the parameters of the added layers, so that the parameters to be learned is reduced compared to the learning of the acoustic model stored in the acoustic model storage unit 5, and speeding up of the learning can be achieved.

The noise degree calculating unit 6 inputs the second feature vector for voice recognition calculated by the second feature vector calculating unit 3 to the neural network of the discriminant model stored in the discriminant model storage unit 7. The noise degree calculating unit 6 applies the output of one of the output units to the voice likelihood Gs in the equation (1), and applies the output of the other of the output units to the noise likelihood Gn in the equation (1). The noise degree calculating unit 6 calculates the noise degree Pn on the basis of the equation (1).

As described above, according to the second embodiment, it is configured that the second feature vector calculating unit 3 calculates, as the second feature vector, the same feature vector as the first feature vector calculated by the first feature vector calculating unit 2, and the acoustic model is the neural network having one or more intermediate layers, and the discriminant model is the neural network in which zero or more intermediate layers and one output layer are added to the intermediate layers or output layer of the neural network of the acoustic model, and only the parameters of the added intermediate layers and output layer are learned, so that the learning required in the discriminant model can be only for the parameters of the layers added to the acoustic model, and the learning of the discriminant model can be performed at high speed. As a result, the learning of the discriminant model can be performed with use of noises more diverse than learning data for the acoustic model, and diverse noises can be distinguished from voice with high accuracy.

Third Embodiment

In this third embodiment, a configuration will be described in which the feature vector calculated by the second feature vector calculating unit 3 is added, as input data to an intermediate layer or output layer of the neural network.

The configuration of a voice recognition device 100 of the third embodiment is the same as the configuration of the voice recognition device 100 of the first embodiment illustrated in FIG. 1, so that illustration of the block diagram is omitted. In addition, components of the voice recognition device 100 of the third embodiment will be described with the same reference numerals as those used in the first embodiment.

The second feature vector calculating unit 3 calculates a one-dimensional or higher-dimensional second feature vector different from the first feature vector calculated by the first feature vector calculating unit 2. The second feature vector calculating unit 3 calculates, for example, a high-order peak value of an autocorrelation coefficient. The higher order of the autocorrelation coefficient is an order corresponding to 80 to 350 Hz that are the fundamental frequencies of voice. The high-order peak value of the autocorrelation coefficient is a feature value effective for discriminating between a vowel and noise, so that the high-order peak value is used as one element of a feature vector for discriminating between voice and noise.

An acoustic model stored in the acoustic model storage unit 5 is a neural network having one or more intermediate layers.

The discriminant model stored in the discriminant model storage unit 7 is a neural network in which zero or more intermediate layers and one output layer are added to the intermediate layers or output layer of the neural network of the acoustic model stored in the acoustic model storage unit 5. Further, in the discriminant model, a feature value of the second feature vector for parameter learning calculated by the second feature vector calculating unit 3 is newly added, as input data to the added beginning intermediate layer or to the added output layer. As described above, the second feature vector is a high-order peak value of an autocorrelation coefficient, and is a one-dimensional vector.

Figure 6:
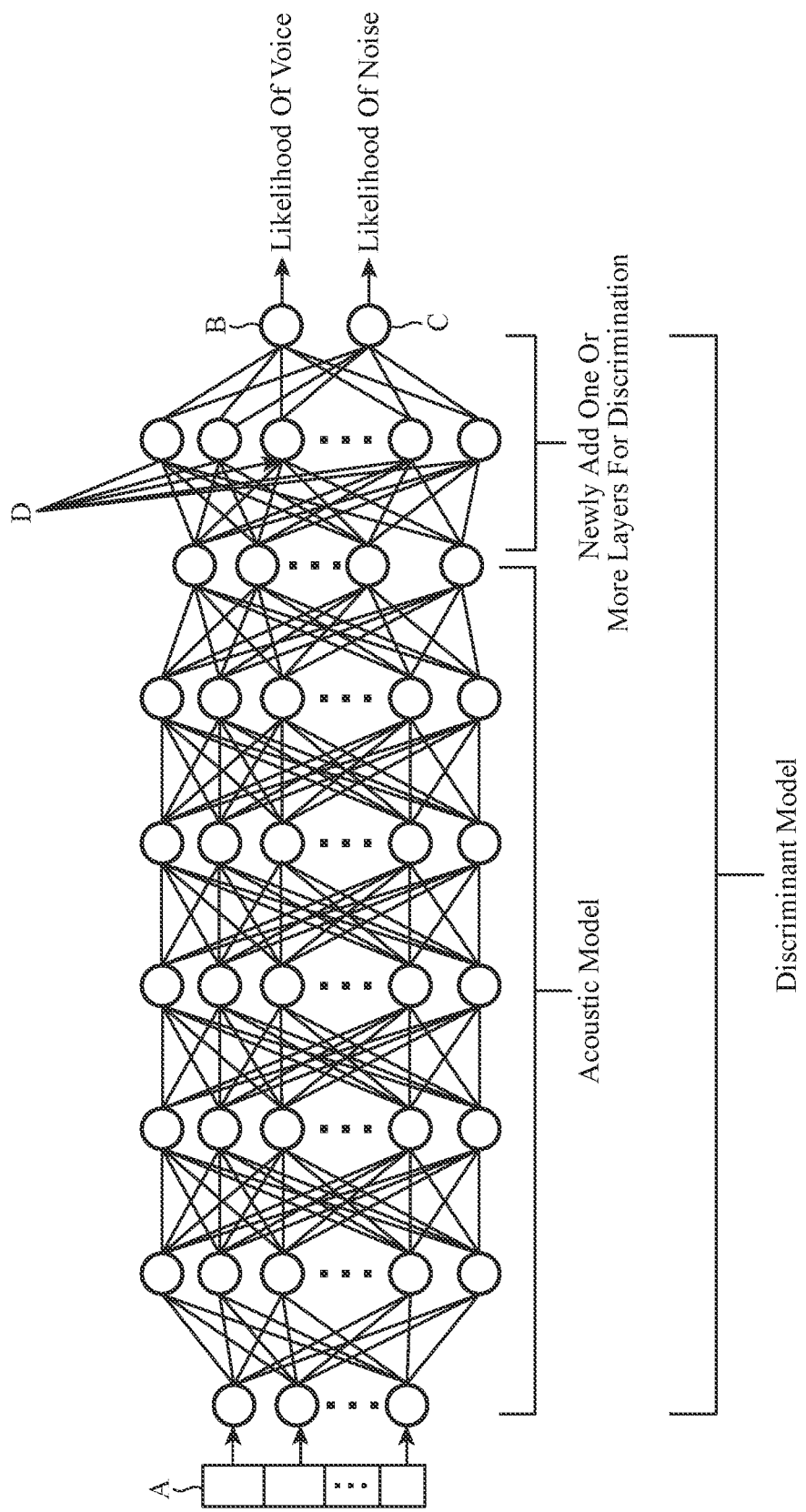
FIG. 6 is a configuration diagram illustrating an example of a discriminant model in a voice recognition device according to a third embodiment.

FIG. 6 is a diagram illustrating an example of the discriminant model in the voice recognition device 100 according to the third embodiment.

As illustrated in FIG. 6, the discriminant model is configured with addition of one intermediate layer and one output layer to the neural network of the acoustic model. In addition, the discriminant model is configured with new addition of a feature value D of the second feature vector for parameter learning to the added one intermediate layer.

The input to the neural network of the discriminant model is a second feature vector A for voice recognition. There are two output units of the neural network of the discriminant model, one output unit B corresponds to a likelihood of voice, and the other output unit C corresponds to a likelihood of noise. By replacing the output of the output unit B with the likelihood Gs of the voice GMM described in the first embodiment and replacing the output of the output unit C with the likelihood Gn of the noise GMM, the noise degree is calculated on the basis of the equation (1) similarly to the first embodiment.

In the discriminant model, learning is separately performed only for parameters of the added layers, and other parameters are the same as those of the acoustic model stored in the acoustic model storage unit 5. In the discriminant model, the learning is necessary only for the parameters of only the added layers, so that the parameters to be learned is reduced compared to the learning of the acoustic model stored in the acoustic model storage unit 5, and speeding up of the learning can be achieved.

The noise degree calculating unit 6 inputs the second feature vector for discriminating between voice and noise calculated by the second feature vector calculating unit 3 to the neural network of the discriminant model stored in the discriminant model storage unit 7. The noise degree calculating unit 6 applies the output of one of the output units to the voice likelihood Gs in the equation (1), and applies the output of the other of the output units to the noise likelihood Gn in the equation (1). The noise degree calculating unit 6 calculates the noise degree Pn on the basis of the equation (1).

As described above, according to the third embodiment, it is configured that the second feature vector calculating unit 3 calculates, as the second feature vector, the one-dimensional or higher-dimensional feature vector different from the first feature vector calculated by the first feature vector calculating unit 2, the acoustic model is the neural network including one or more intermediate layers, and the discriminant model is the neural network in which zero or more intermediate layers and one output layer are added to the intermediate layers or the output layer of the neural network of the acoustic model, the feature value of the second feature vector calculated by the second feature vector calculating unit 3 is added, as the input data to the added beginning intermediate layer or to the added output layer, and only the parameters of the added intermediate layers and output layer are learned, so that discrimination accuracy between voice and noise can be improved. In addition, the learning required in the discriminant model can be only for the parameters of the layers added to the acoustic model, and the learning of the discriminant model can be performed at high speed. As a result, the learning of the discriminant model can be performed with use of noises more diverse than learning data for the acoustic model, and diverse noises can be distinguished from voice with high accuracy.

In addition, according to the third embodiment, the feature vector calculated by the second feature vector calculating unit 3 is newly added, as the input data to the beginning intermediate layer or output layer added to the neural network, so that the discrimination accuracy between voice and noise can be improved.

Besides the above, in the present invention, within the scope of the invention, free combination of the embodiments, a modification of any component of each of the embodiments, or omission of any component of each of the embodiments is possible.

INDUSTRIAL APPLICABILITY

The voice recognition device according to the present invention is suitable for being used for a device or the like which is to be used under a noise environment and is required to improve determination accuracy, and for implementing voice recognition processing in which voice and noise are accurately distinguished.

REFERENCE SIGNS LIST

1: Voice section extracting unit, 2: First feature vector calculating unit, 3: Second feature vector calculating unit, 4: Acoustic likelihood calculating unit, 5: Acoustic model storage unit, 6: Noise degree calculating unit, 7: Discriminant model storage unit, 8: Noise likelihood recalculating unit, 9: Collation unit, 10: Vocabulary model storage unit, 100: Voice recognition device.

The invention claimed is:

1. A voice recognition device comprising:
a processor to execute a program; and
a memory to store the program which, when executed by the processor, performs processes of,
calculating a first feature vector from voice data input;
calculating acoustic likelihoods of respective phonemes and an acoustic likelihood of noise of the first feature vector, by using an acoustic model used for calculating an acoustic likelihood of a feature vector;
calculating a second feature vector from the voice data;
calculating a noise degree of the second feature vector, by using a discriminant model used for calculating a noise degree indicating whether a feature vector is noise or voice;
recalculating an acoustic likelihood of noise on a basis of a larger value between the acoustic likelihood of noise of the first feature vector, and a likelihood that is calculated by adding a maximum value of the acoustic likelihoods of respective phonemes to the noise degree of the second feature vector; and
performing collation with a pattern of a vocabulary word to be recognized, by using the acoustic likelihoods of respective phonemes calculated and the acoustic likelihood of noise recalculated, and outputting a recognition result of the voice data,
wherein the second feature vector is a one-dimensional or higher-dimensional feature vector different from the first feature vector.

2. The voice recognition device according to claim 1, wherein the processes include calculating, as the second feature vector, a one-dimensional or higher-dimensional feature vector different from the first feature vector calculated.

3. The voice recognition device according to claim 2, wherein the acoustic model is a neural network including one or more intermediate layers, and
the discriminant model is a neural network in which zero or more intermediate layers and one output layer are added to the intermediate layers or an output layer of the neural network of the acoustic model, a feature value of the second feature vector calculated is added, as input data to a beginning intermediate layer of the added intermediate layers or to the added output layer, and only parameters of the added intermediate layers and output layer are learned.

4. A voice recognition method comprising:

calculating a first feature vector from voice data input;

calculating acoustic likelihoods of respective phonemes and an acoustic likelihood of noise of the first feature vector by using an acoustic model used for calculating an acoustic likelihood of a feature vector;

calculating a second feature vector from the voice data;

calculating a noise degree of the second feature vector by using a discriminant model used for calculating a noise degree indicating whether a feature vector is noise or voice;

recalculating an acoustic likelihood of noise on a basis of a larger value between the acoustic likelihood of noise of the first feature vector, and a likelihood that is calculated by adding a maximum value of the acoustic likelihoods of respective phonemes to the noise degree of the second feature vector; and performing collation with a pattern of a vocabulary word to be recognized, by using the acoustic likelihoods of respective phonemes calculated and the acoustic likelihood of noise recalculated, and outputting a recognition result of the voice data, wherein the second feature vector is a one-dimensional or higher-dimensional feature vector different from the first feature vector.

* * * * *